US008306953B2

(12) United States Patent
Agarwala et al.

(10) Patent No.: US 8,306,953 B2
(45) Date of Patent: Nov. 6, 2012

(54) ONLINE MANAGEMENT OF HISTORICAL DATA FOR EFFICIENT REPORTING AND ANALYTICS

(75) Inventors: Sandip Agarwala, Sunnyvale, CA (US); Sandeep Gopisetty, Morgan Hill, CA (US); Stefan Jaquet, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 12/872,964

(22) Filed: Aug. 31, 2010

(65) Prior Publication Data
US 2012/0054181 A1 Mar. 1, 2012

(51) Int. Cl.
G06F 7/00 (2006.01)
G06F 17/30 (2006.01)
(52) U.S. Cl. ........ 707/688; 707/736; 702/179; 702/187; 703/2
(58) Field of Classification Search .................. 707/688, 707/725, 751, 768, 736, E17.014; 702/179, 702/187; 703/2
See application file for complete search history.

(56) References Cited

U.S. PATENT DOCUMENTS

| 6,058,368 | A * | 5/2000 | Aourane ........................ 705/7.37 |
| 6,408,291 | B1 | 6/2002 | Skeen et al. |
| 6,594,653 | B2 | 7/2003 | Colby et al. |
| 2002/0073241 | A1* | 6/2002 | Gilbert et al. .................. 709/312 |
| 2002/0129017 | A1* | 9/2002 | Kil et al. ........................... 707/6 |
| 2006/0059066 | A1* | 3/2006 | Glinberg et al. ................ 705/35 |
| 2006/0085394 | A1 | 4/2006 | Barsness et al. |
| 2007/0005297 | A1* | 1/2007 | Beresniewicz et al. ........ 702/181 |
| 2008/0021741 | A1* | 1/2008 | Holla et al. ......................... 705/3 |
| 2008/0126943 | A1* | 5/2008 | Parasnis et al. ................ 715/730 |
| 2008/0177513 | A1* | 7/2008 | Miller ................................ 703/2 |
| 2008/0215546 | A1* | 9/2008 | Baum et al. ........................ 707/3 |
| 2009/0099866 | A1 | 4/2009 | Newman ........................... 705/2 |
| 2009/0299987 | A1* | 12/2009 | Willson ............................. 707/4 |
| 2011/0213508 | A1* | 9/2011 | Mandagere et al. .......... 700/291 |
| 2012/0054181 | A1* | 3/2012 | Agarwala et al. ............. 707/736 |

OTHER PUBLICATIONS

Khalil Amiri, Garth A. Gibson and Richard Golding—"Highly concurrent shared storage"—Distributed Computing Systems, 2000. Proceedings. 20th International Conference on, Date of Conference: 2000, pp. 298-307.*

(Continued)

Primary Examiner — John Breene
Assistant Examiner — Anh Ly
(74) Attorney, Agent, or Firm — Cantor Colburn LLP

(57) ABSTRACT

Embodiments for efficiently computing complex statistics from historical time series data are provided. A hierarchical summarization method includes receiving at least one stream of data and creating data blocks from the at least one stream of data. In another embodiment, a method for computing statistics for historical data includes accessing at least one online stream of historical data, the online stream of historical data including metadata, and creating data blocks from the at least one online stream of historical data. Each data block includes a pair of timestamps indicating a sampling start time and a sampling end time, a number of data samples spanned by the data block, a SUM(X) statistic, a SUM(XX) statistic, and a SUM(XY) statistic computed for the data samples spanned by the data block. Other methods are also presented, such as methods for efficiently and accurately calculating statistical queries regarding historical data for arbitrary time ranges, among others.

13 Claims, 5 Drawing Sheets

OTHER PUBLICATIONS

Rakesh Barve, Elizabeth Shrivert, Phillip B. Gibbonst, Bruce K. Hillyert, Yossi Matiast and Jeffrey Scott Vitter—"Modeling and optimizing I/O throughput of multiple disks on a bus"—Proceeding SIGMETRICS '99 Proceedings of the 1999 ACM SIGMETRICS international conference on Measurement and modeling, vol. 27 Issue 1, Jun. 1999,(pp. 83-92).*

Kannan Rajah, Sanjay Ranka and Ye Xia—"Scheduling Bulk File Transfers with Start and End Times"—Sixth IEEE International Symposium on Network Computing and Applications (NCA 2007)—Network Computing and Applications, 2007. NCA 2007. Sixth IEEE International—(pp. 295-298).*

Charu C. Aggarwal, "On Futuristic Query Processing in Data Streams", Advances in Database Technology—EDBT 2006, Springerlink.

Poosala, V., "Fast Approximate Query Answering Using Precomputed Statistics", Proceedings, 15th International Conference on Volume Data Engineering, 1999, Issue, Mar. 23-26, 1999 pp. 252, IEEE.

* cited by examiner

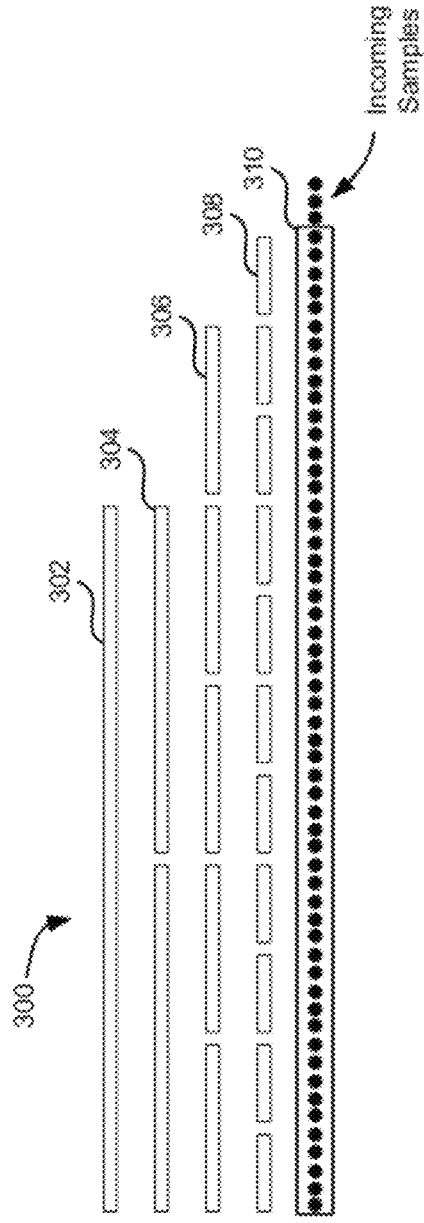
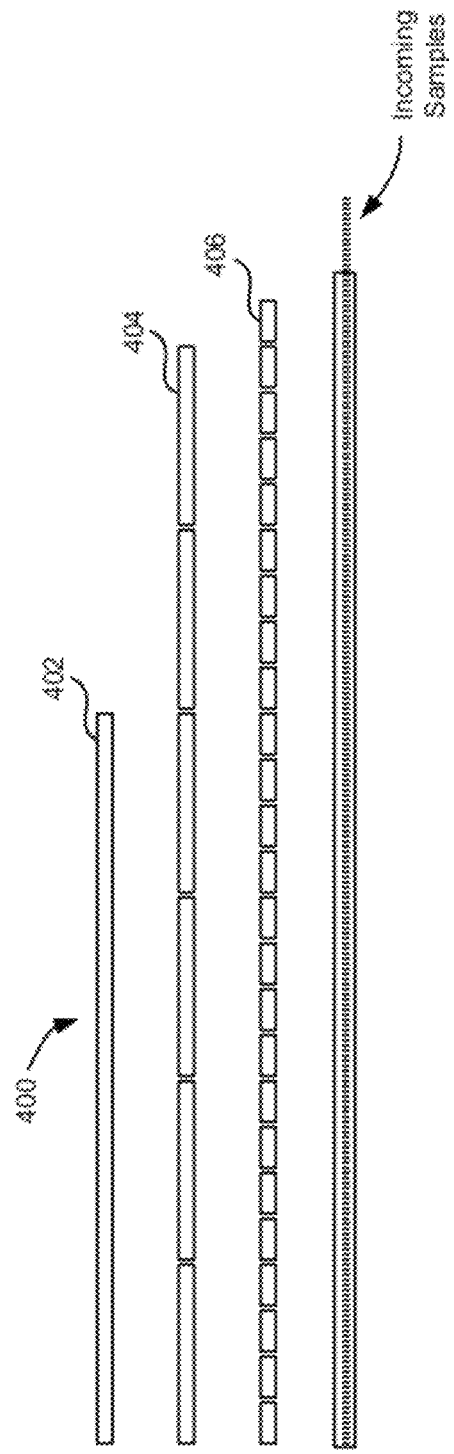
FIG. 3
FIG. 4

ONLINE MANAGEMENT OF HISTORICAL DATA FOR EFFICIENT REPORTING AND ANALYTICS

BACKGROUND

The present invention relates generally to online management of historical data, and more particularly, to efficient reporting and analytics using online management of historical data.

As enterprise systems evolve and grow bigger, managing these systems is becoming increasingly difficult and complex. Manual management of enterprise systems can be costly, error-prone, time-consuming, and is not scalable. In recent years, much emphasis has been put on automating various system management tasks, such as discovery, provisioning, chargeback, configuration management, resource management, and end-to-end analysis. Many of these management tasks have to analyze historical data generated by the different components of the enterprise systems or applications running on the enterprise systems. Most realistic systems generate large amounts of historical data that may include information related to usage, performance, and/or configuration changes.

In order to manage these systems effectively, the management solutions for these systems should be able to scale and efficiently process large quantities of data. It is known that the quality of any runtime analysis is dependent on a number of factors. These factors include timeliness and amount of resources consumed to perform the particular analysis, among other various factors. The usefulness of the runtime analysis diminishes, in most cases, if the analysis takes too long to execute. For example, the result of a system load analyzer may not be sufficiently reliable if it takes a long time to analyze performance data. This is because the system behavior may have changed during the period of analysis, therefore when the results of the analysis become available, they no longer apply to the current running situation. Similarly, for interactive system management tasks, administrators generally expect to see the results immediately. Interactive system management tasks become a challenge for enterprise data centers or high-performance computing (HPC) systems, which have large number of possible configurations and may generate gigabytes of historical data every minute.

BRIEF SUMMARY

Embodiments for efficiently computing complex statistics from historical time series data are provided. In one embodiment, a method includes receiving at least one stream of data and creating data blocks from the at least one stream of data. Each data block includes a pair of timestamps indicating a sampling start time and a sampling end time, a number of data samples spanned by the data block, a SUM(X) statistic computed for the data samples spanned by the data block, a SUM(XX) statistic computed for the data samples spanned by the data block, and a SUM(XY) statistic computed for the data samples spanned by the data block.

In another embodiment, a system that comprises a processor operative to execute computer usable program code, at least one of a network interface and a peripheral device interface for receiving user input, and a computer usable storage medium having computer usable program code embodied therewith. The computer usable program code comprises computer usable program code configured to receive a query for at least one statistic during a time period, computer usable program code configured to determine a least number of non-overlapping blocks to access in a hierarchical summary of historical data based on the time period, computer usable program code configured to access the determined least number of non-overlapping blocks in the hierarchical summary of historical data. The computer usable program code further comprises computer usable program code configured to combine information in the non-overlapping blocks in the hierarchical summary of historical data to output the at least one statistic requested by the query According to another embodiment, a computer program product that comprises a computer readable storage medium having computer readable program code embodied therewith. The computer readable program code comprises computer readable program code configured to receive at least one stream of data and computer readable program code configured to create data blocks from the at least one stream of data. Each data block comprises a pair of timestamps indicating a sampling start time and a sampling end time, a number of data samples spanned by the data block, a SUM(X) statistic computed for the data samples spanned by the data block, a SUM(XX) statistic computed for the data samples spanned by the data block, and a SUM(XY) statistic computed for the data samples spanned by the data block

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which:

FIG. 3 is an illustrative diagram showing incoming data samples and data block aggregation principles, according to one embodiment.

FIG. 4 is an illustrative diagram showing incoming data samples and data block aggregation principles, according to one embodiment.

DETAILED DESCRIPTION

Figure 1:
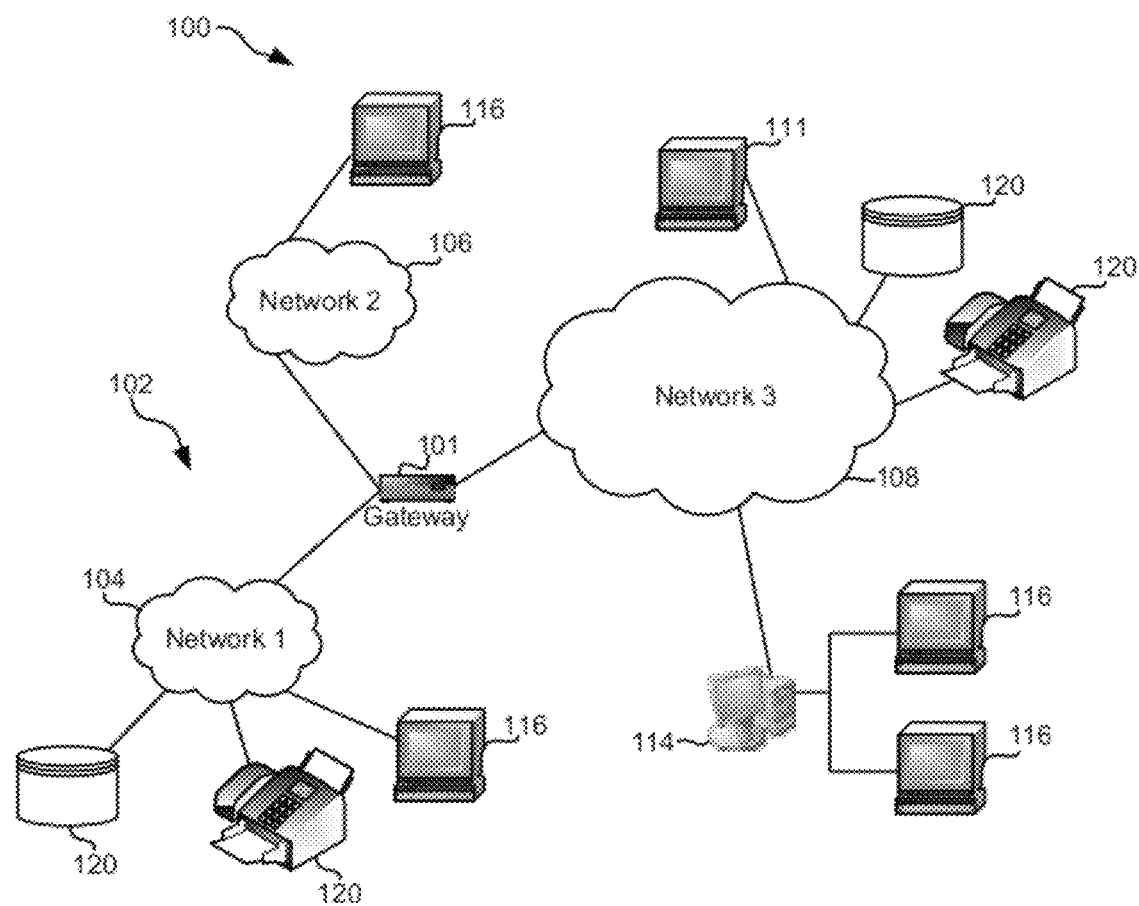
FIG. 1 illustrates a network architecture, in accordance with one embodiment.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Embodiments for efficiently computing complex statistics from historical time series data are provided. In one general embodiment, a method includes receiving at least one stream of data and creating data blocks from the at least one stream of data. Each data block includes a pair of timestamps indicating a sampling start time and a sampling end time, a number of data samples spanned by the data block, a SUM(X) statistic computed for the data samples spanned by the data block, a SUM(XX) statistic computed for the data samples spanned by the data block, and a SUM(XY) statistic computed for the data samples spanned by the data block.

In another embodiment, a system that comprises a processor operative to execute computer usable program code, at least one of a network interface and a peripheral device interface for receiving user input, and a computer usable storage medium having computer usable program code embodied therewith. The computer usable program code comprises computer usable program code configured to receive a query for at least one statistic during a time period, computer usable program code configured to determine a least number of non-overlapping blocks to access in a hierarchical summary of historical data based on the time period, computer usable program code configured to access the determined least number of non-overlapping blocks in the hierarchical summary of historical data. The computer usable program code further comprises computer usable program code configured to combine information in the non-overlapping blocks in the hierarchical summary of historical data to output the at least one statistic requested by the query According to another embodiment, a computer program product that comprises a computer readable storage medium having computer readable program code embodied therewith. The computer readable program code comprises computer readable program code configured to receive at least one stream of data and computer readable program code configured to create data blocks from the at least one stream of data. Each data block comprises a pair of timestamps indicating a sampling start time and a sampling end time, a number of data samples spanned by the data block, a SUM(X) statistic computed for the data samples spanned by the data block, a SUM(XX) statistic computed for the data samples spanned by the data block, and a SUM(XY) statistic computed for the data samples spanned by the data block As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the description, a network element may refer to any component of a network.

Figure 2:
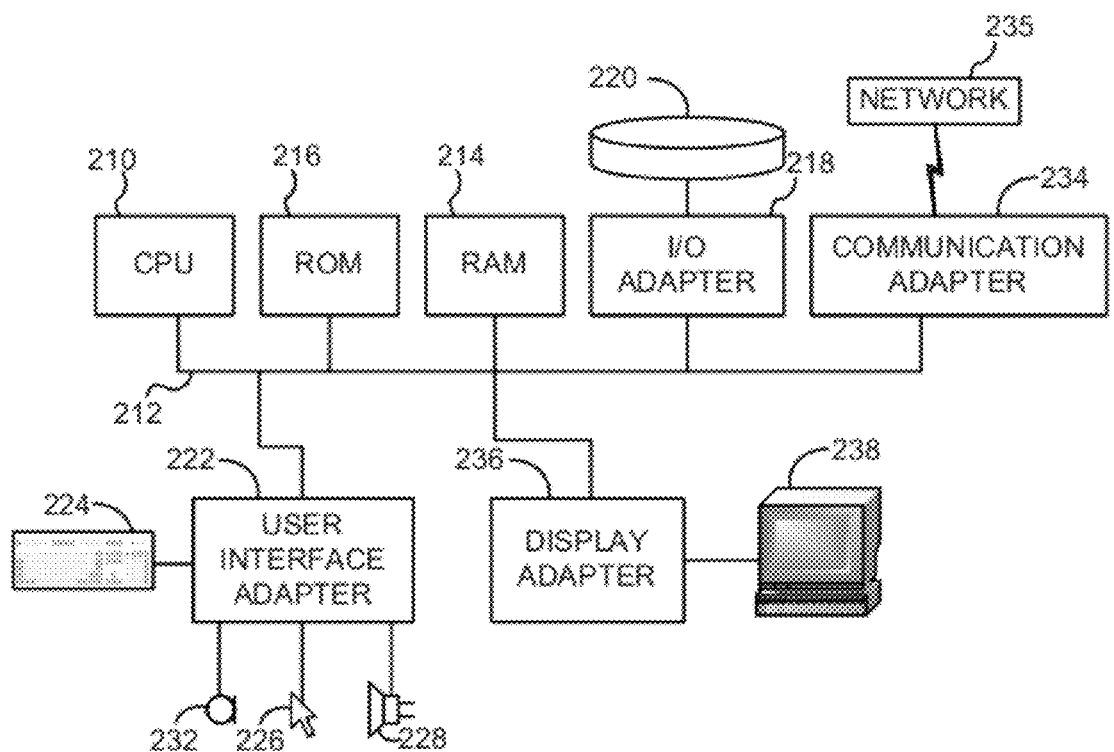
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. In FIG. 2, a typical hardware configuration of a workstation is shown having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have an operating system resident thereon. A preferred embodiment may be written using JAVA, XML, C, and/or C++ language, or other programming languages, along with an object oriented programming methodology. Object oriented programming (OOP), which has become increasingly used to develop complex applications, may be used.

System resource management tools collect large amounts of data related to usage, performance, configuration, and so forth, from their managed environments. The managed environment may consist of many different kinds of servers, networks, and storage resources, in addition to applications and other software components. The historical data collected from these components may be used for a number of reasons, including, but not limited to, simple reporting and auditing, to chargeback, to advanced analytics like capacity planning, problem determination, impact analyses, etc.

One of the major challenges in this area is managing continuous streams of historical data from the managed components. This management involves storage of large numbers of data streams as well as retrieval of raw data and statistics, such as sum, mean, variance, etc., for each of those data streams. Furthermore, certain management tasks may use statistics or data for an arbitrary range of time in the history. For example, the variance of the system load in September of last year may be called. Running statistics, like mean of the entire length of history, or for certain lengths of time into the past may be easy, and inexpensive, to maintain. However, being able to evaluate these statistics for any arbitrary time window in the past can be a costly operation and typically requires computing the statistics from raw data each time the statistics are desired. Most current System Resource Management (SRM) tools perform their analyses on-demand by analyzing the system behavior from raw historical data and this is typically a resource-intensive and time consuming operation, in addition to being difficult to scale.

In one approach, a hierarchical summarization technique that computes and stores certain key primitive statistics in a tree-like data structure from online streams of historical data is presented. Updates to the tree-like data structure occur in near-constant time, which allows this technique to scale to large number of online streams, in some embodiments. When an application queries some statistics for a specific time range, the result is computed in near-constant time. This may allow the analytics to run faster, increase scalability, and improve the usability and/or effectiveness of the management solution overall.

According to one exemplary embodiment, some queries may include: average utilization of a storage pool during a time period, as defined by $t_1$ and $t_2$; sum of I/O traffic for a file system during the time period; rank storage volumes based on the volumes' usages during the time period; forecast load on a storage pool based on a traffic pattern during the time period, etc. Each query may be based on the same time period, different time periods, usage periods, periods of activity/inactivity, or any other period that can be queried by the system.

Referring now to FIG. 3, there is shown an exemplary embodiment of a hierarchical summarization technique. Input comprising incoming samples is fed to the system 300. The incoming samples typically comprise a near-continuous stream of data samples comprising a data set pair. In one embodiment, the data set pair generally comprises a timestamp, value pair. These samples are typically stored in a "flat" operational database 310 or in some custom format for the purpose of creating reports, configuring systems, performing management tasks, and other such relevant information. In addition to storing the data set pairs, additional statistics are stored for every block of data samples 308. The number of data samples that are stored in a block 308, according to one embodiment, may be defined by the Sample Aggregation Ratio ($R_S$). For example, if the $R_S$ equals 100, then 100 data samples are packaged into a block 308. The next 100 data samples are then received and are packaged into a new block 308, and so forth. For every $R_S$ number of samples received, a new block is defined and at least the following information is recorded for that block: ($t_S$, $t_E$), where $t_S$ is the timestamp of the first sample in the block; $t_E$ is the timestamp of the last sample in the block; N, which is the number of samples in the block; and three fundamental statistics, which include SUM(X), SUM(XX), and SUM(XY). 'X' represents the 'value' of the sample and 'Y' represents the sample's timestamp. Additional statistics can also be recorded if desired. For a block having a number of data samples (N) equal to the Sample Aggregation Ratio ($R_S$), the statistics collected may be represented as follows.

$$N = \sum_i^{R_S} n_i$$

$$SUM(X) = \sum_i^{R_S} X_i$$

$$SUM(XX) = \sum_i^{R_S} X_i^2$$

$$SUM(XY) = \sum_i^{R_S} X_i Y_i$$

This description of the hierarchical summarization technique defines the first level of metadata extraction, according to one approach.

As shown in FIG. 4, the summarization process 400 is not limited to the first level alone. A Block Aggregation Ratio ($R_B$) may be defined for which a number of blocks are grouped together to define a higher level block. In one approach, for every $R_B$ blocks that are created, a new higher level block is defined for the level above the group of blocks with the same set of statistics previously described. The statistics associated with a particular block in the upper levels can be computed from the statistics of the blocks in the level just below it. This is illustrated in the formula below. 'R' denotes the set of blocks that are being summarized by the block just above them.

$$N_{new} = \sum_i^{R_B} n_i$$

$$SUM_{new}(X) = \sum_i^{R_B} Sum_i(X)$$

$$SUM_{new}(X^2) = \sum_i^{R_B} Sum_i(X^2)$$

$$SUM_{new}(XY) = \sum_i^{R_B} Sum_i(XY)$$

For example, if $R_B$ equals 4 as shown in FIG. 4, then each higher level block 402 includes four lower level blocks 404. Likewise, each block 404 includes four lower level blocks 406. Any value for $R_B$ may be used, as set by a user or administrator, as automatically determined during execution of the process, etc.

In some approaches, the aggregation ratios ($R_S$ and $R_B$) can be automatically set, defined by the administrator, set by a user, set to optimize sampling rates, etc. These ratios may also change over periods of time, such as in response to changing data sample reception rates.

Referring again to FIG. 3, in order to compute statistics for arbitrary time ranges ($t_1$, $t_2$), the algorithm may determine the least number of non-overlapping blocks starting from the top (as shown in FIG. 3, starting with block 302, then block 304, etc.). In FIG. 3, the $R_B$ equals two, as seen by two lower level blocks 304 being packaged in each higher level block 302, and two lower level blocks 306 being packaged in each block 304, etc. The average number of blocks that is to be processed is of the order O($R_B$), which is near-constant time. In comparison, computing the same statistics from the raw data, as shown as incoming samples, requires O(N) time, where N is the number of data samples in the time range ($t_1$, $t_2$).

There are multiple scenarios where the techniques described herein may be useful. For example, System and Storage Resource Management (SRM) tools may take advantage of this technology to optimize the runtime execution of its various performance related analytics. Also, contributions of the techniques described herein, among others, are that the technique permits computation of many common statistics (average, correlation, linear regression, standard deviation) efficiently (in near-constant time) as opposed to linear time, and these statistics can be computed efficiently for any arbitrary time window, as opposed to a fixed time window.

In another approach, real-time charting of performance and chargeback statistics can be made more efficient using this technique. Users can analyze data at different time granularity, etc. This technique can also be useful in charting and analyzing other time-series data such as stock prices, sensor data, and other time-series data, overlay piece-wise trend lines, perform comparative analyses, and so forth. All of these tasks may be performed in real-time and without the need to compute them from scratch using raw data.

In many cases, systems need to be designed or provisioned based on behavior during a particular period of time(s). In addition, there may be situations when the system's performance or workload behavior during certain period(s) of time are not representative of their overall performance and/or behavioral trend. In such scenarios, computing behavioral statistics after eliminating those non-representative samples provides far better results. However, this may not be possible using simple aggregated statistics.

According to preferred embodiments, the techniques disclosed herein may significantly reduce the run-time resource requirements of a system running the invention. Statistics can be computed in near-constant time, while the amount of temporary data that needs to be processed/stored in memory is minimal. Thus, the embodiments provide techniques that are easily scalable.

Figure 5:
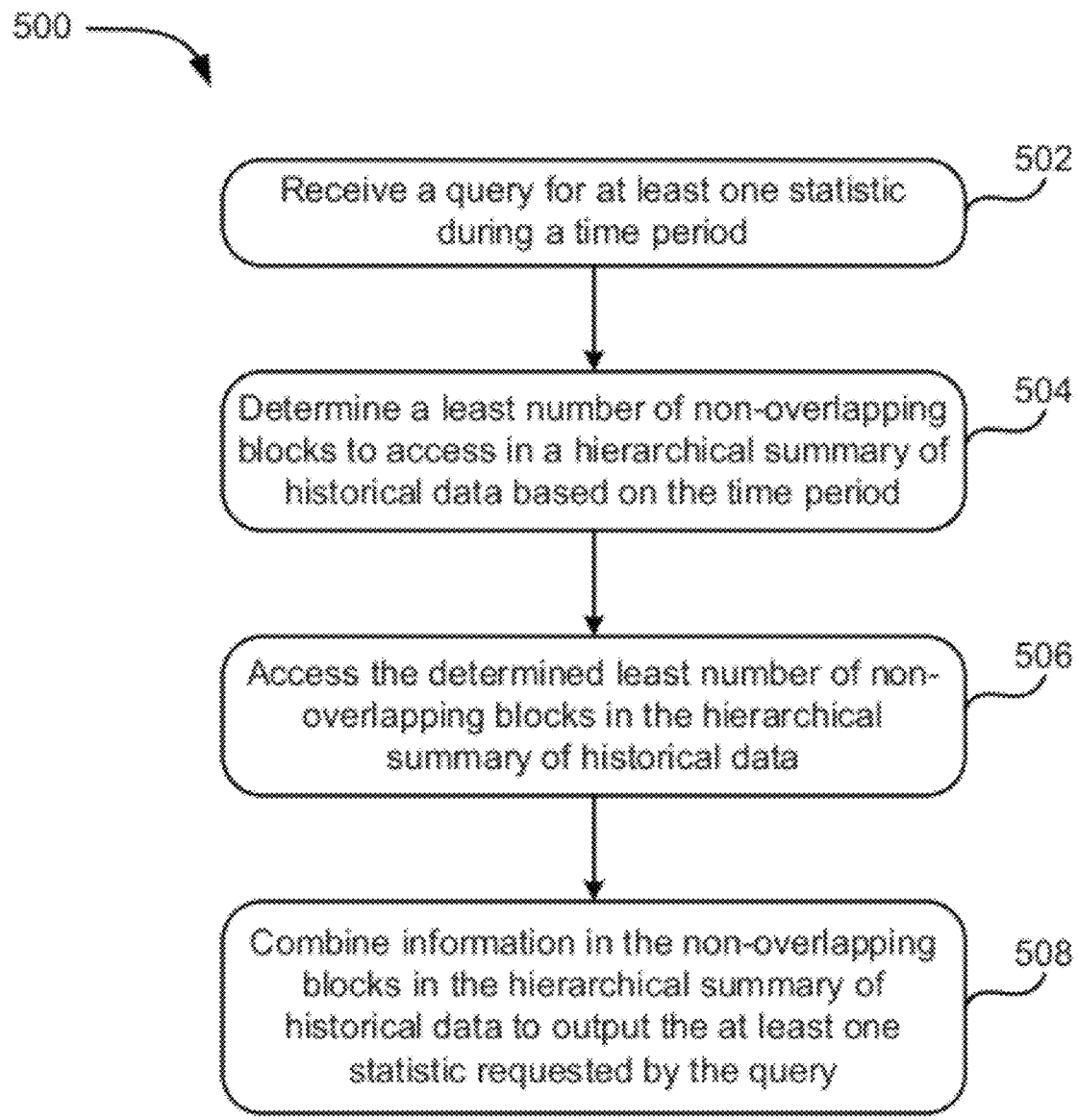
FIG. 5 is a flow diagram showing a method for efficiently and accurately calculating statistical queries regarding historical data, according to one embodiment.

Now referring to FIG. 5, there is shown an exemplary embodiment of a method 500 for efficiently and accurately calculating statistical queries regarding historical data. The method 500 may be performed in any suitable environment, including those described in FIGS. 1-2, among other suitable environments.

In operation 502, a query is received for at least one statistic during a time period. Any desired statistic may be requested, such as SUM(X), SUM(XX), and SUM(XY), which have been described in detail above. The query may originate and/or be sent from any source, such as a remote computer system, a user's input to a computer system performing the method 500, an automatically generated query as a result of a predefined condition being met, or any suitable origination source.

In operation 504, a least number of non-overlapping blocks to access in a hierarchical summary of historical data is determined based on the time period. The least number of non-overlapping blocks to access may be determined according to any method known in the art. For example, the methods of determining a least number of non-overlapping blocks, as described in relation to FIGS. 3-4 may be used, according to several embodiments.

In operation 506, the determined least number of non-overlapping blocks in the hierarchical summary of historical data are accessed. Any system, program, application, etc., may access the determined non-overlapping blocks in the hierarchical summary of historical data, such as the computer system performing the method 500, another computer system having access to the hierarchical summary of historical data, an application specifically running to handle the hierarchical summary of historical data, etc.

In operation 508, information in the non-overlapping blocks in the hierarchical summary of historical data are combined to output the at least one statistic requested by the query. This combining may be of any type, such as those described previously regarding statistics SUM(X), SUM(XX), and SUM(XY), or any other combinations as would be known to one of skill in the art.

In one embodiment, the time period may be arbitrarily chosen. In another embodiment, the time period may be selected by a user, an application, the computer system performing the method 500, or another computer system, for example. In additional embodiments, the time period may be determined based on a number of factors, such as alerts received, performance changes, memory accesses, among other known factors.

Figure 6:
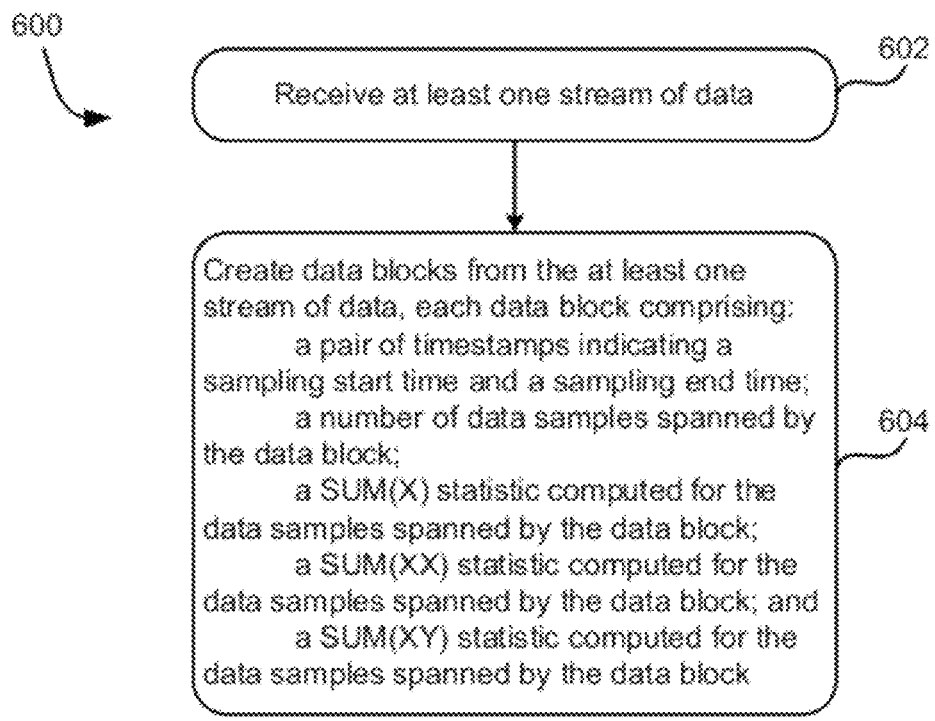
FIG. 6 is a flow diagram showing a hierarchical summarization method, according to one embodiment.

Now referring to FIG. 6, an exemplary hierarchical summarization method 600 is shown according to one embodiment. The method 600 may be performed in any suitable environment, including those described in FIGS. 1-2, among other suitable environments.

In operation 602, at least one stream of data is received. In one embodiment, the stream of data may be a near-continuous stream of historical data samples comprising a data set pair. Further, the data set pair may include a timestamp and a value.

In operation 604, data blocks are created from the at least one stream of data. Each data block includes a pair of timestamps indicating a sampling start time and a sampling end time, a number of data samples spanned by the data block, a SUM(X) statistic computed for the data samples spanned by the data block, a SUM(XX) statistic computed for the data samples spanned by the data block, and a SUM(XY) statistic computed for the data samples spanned by the data block. The statistics included in each data block may be calculated as described previously. Of course, other statistics may also be included in each data block.

In one approach, a next data block may be created after a Sample Aggregation Ratio number of data samples have been received. The Sample Aggregation Ratio number of data samples may be set automatically, predetermined by a user, in response to conditions, etc. In some preferred approaches, the Sample Aggregation Ratio may be continuously updated based on predetermined factors, such as length of time to perform operations, historical access times based on the Sample Aggregation Ratio value, etc.

In a further embodiment, the method 600 may also include creating higher level blocks after every Block Aggregation Ratio number of data blocks have been created. Each of the higher level blocks include a pair of timestamps indicating a sampling start time and a sampling end time, a number of data blocks included in the higher level block, a SUM(X) statistic computed for the data blocks spanned by the higher level data block, a SUM(XX) statistic computed for the data blocks spanned by the higher level data block, and a SUM(XY) statistic computed for the data blocks spanned by the higher level data block. The statistics included in each higher level data block may be calculated as described previously. Of course, other statistics may also be included in each higher level data block.

In one approach, the Block Aggregation Ratio may be set automatically, set by a user, in response to conditions, etc. In some preferred approaches, the Block Aggregation Ratio may be continuously updated based on predetermined factors, such as length of time to perform operations, historical access times based on the Sample Aggregation Ratio value, etc.

Figure 7:
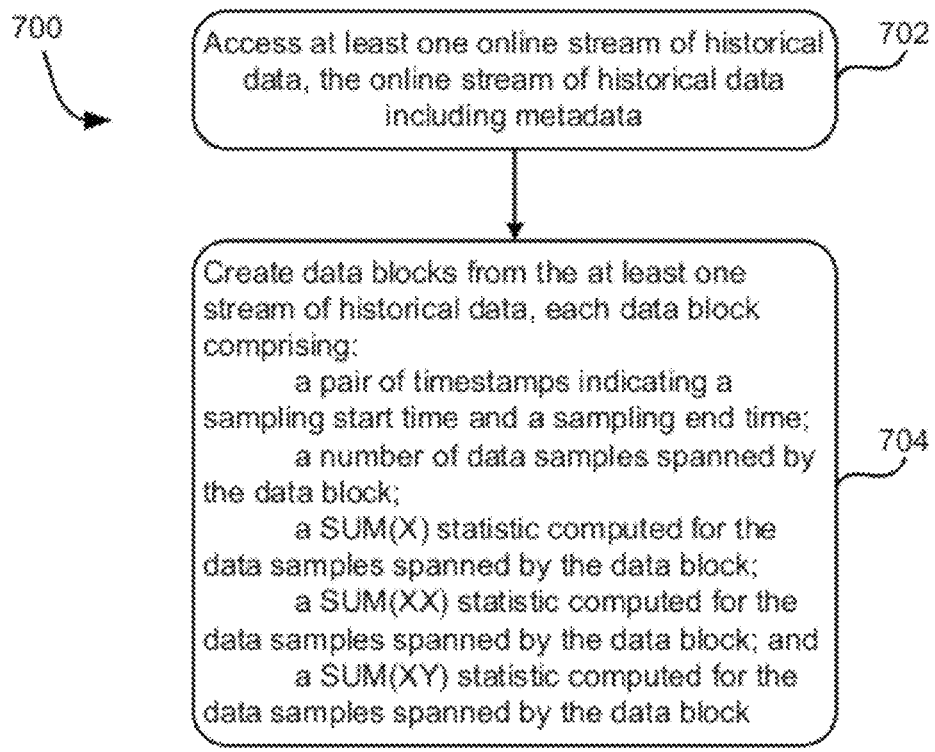
FIG. 7 is a flow diagram showing a method for computing statistics for historical data, according to one embodiment.

Now referring to FIG. 7, a method 700 for computing statistics for historical data is shown according to one embodiment. The method 700 may be performed in any suitable environment, including those described in FIGS. 1-2, among other suitable environments.

In operation 702, at least one online stream of historical data is accessed. The online stream of historical data includes metadata. Any method of accessing may be used, and any system, application, program, etc., may access the online stream.

In operation 704, data blocks are created from the at least one online stream of historical data. Each data block includes a pair of timestamps indicating a sampling start time and a sampling end time, a number of data samples spanned by the data block, a SUM(X) statistic computed for the data samples spanned by the data block, a SUM(XX) statistic computed for the data samples spanned by the data block, and a SUM(XY) statistic computed for the data samples spanned by the data block. The statistics included in each data block may be calculated as described previously. Of course, other statistics may also be included in each data block.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A computer-implemented method comprising:
   receiving, at a communications adapter circuit, at least one stream of data; and creating data blocks from the at least one stream of data, each data block comprising:
   a pair of timestamps comprising a sampling start time and a sampling end time;
   a number of data samples spanned by the data block;

a SUM(X) statistic computed for the data samples spanned by the data block;

a SUM(XX) statistic computed for the data samples spanned by the data block; and a SUM(XY) statistic computed for the data samples spanned by the data block, wherein the at least one stream of data is a near-continuous stream of historical data samples comprising a data set pair; and wherein the data set pair comprises a timestamp and a value.

2. The method of claim 1, wherein a next data block is created after a Sample Aggregation Ratio number of data samples have been received.

3. The method of claim 2, wherein the Sample Aggregation Ratio is predetermined by a user.

4. The method of claim 2, wherein the Sample Aggregation Ration is continuously updated based on predetermined factors.

5. The method of claim 2, further comprising:

creating higher level blocks after every Block Aggregation Ratio number of data blocks have been created, the higher level blocks each having:

a pair of timestamps comprising a sampling start time and a sampling end time;

a number of data blocks included in the higher level block;

a SUM(X) statistic computed for the data blocks spanned by the higher level data block;

a SUM(XX) statistic computed for the data blocks spanned by the higher level data block; and a SUM(XY) statistic computed for the data blocks spanned by the higher level data block.

6. The method of claim 5, wherein the Block Aggregation Ratio is set by a user.

7. The method of claim 5, wherein the Block Aggregation Ratio is continuously updated based on predetermined factors.

8. A computer program product comprising:

a computer readable storage medium having computer readable program code embodied therewith, the computer readable program code comprising:

computer readable program code configured to receive at least one stream of data; and computer readable program code configured to create data blocks from the at least one steam of data, each data block comprising:

a pair of timestamps comprising a sampling start time and a sampling end time;

a number of data samples spanned by the data block;

a SUM(X) statistic computed for the data samples spanned by the data blocked;

a SUM(XX) statistic computed for the data samples spanned by the data block; and a SUM(XY) statistic computed for the data samples spanned by the data block, wherein the at least one stream of data is a near-continuous stream of historical data samples comprising a data set pair; and wherein the data set pair comprises a timestamp and a value.

9. The computer program product of claim 8, wherein a next data block is created after a Sample Aggregation Ratio number of data samples have been received.

10. The computer program product of claim 9, wherein the Sample Aggregation Ratio is predetermined by a user.

11. The computer program product of claim 9, wherein the Sample Aggregation Ratio is continuously updated based on predetermined factors.

12. The computer program product of claim 9, further comprising:

computer readable program code configured to create higher level blocks after every Block Aggregation Ratio number of data blocks have been created, the higher level blocks each having:

a pair of timestamps comprising a sampling start time and a sampling end time;

a number of data blocks included in the higher level block;

a SUM(X) statistic computed for the data blocks spanned by the higher level data block;

a SUM(XX) statistic computed for the data blocks spanned by the higher level data block; and a SUM(XY) statistic computed for the data blocks spanned by the higher level data block.

13. The computer program product of claim 12, wherein the Block Aggregation Ratio is set by a user and wherein the Block Aggregation Ratio is continuously updated based on predetermined factors.

* * * * *